US008348182B2

(12) United States Patent
Keren (10) Patent No.: US 8,348,182 B2
(45) Date of Patent: Jan. 8, 2013

(54) IRRIGATION PIPE

(75) Inventor: Ron Keren, D.N. Hanegev (IL)

(73) Assignee: Netafim, Ltd., Tel Aviv (IL)

( * ) Notice: Subject to any disclaimer, the term of this patent is extended or adjusted under 35 U.S.C. 154(b) by 437 days.

(21) Appl. No.: 11/838,907

(22) Filed: Aug. 15, 2007

(65) Prior Publication Data

US 2008/0041978 A1 Feb. 21, 2008

(30) Foreign Application Priority Data

Aug. 17, 2006 (IL) .......................................... 177552

(51) Int. Cl.
*B05B 15/00* (2006.01)
*B05B 1/14* (2006.01)
*A62C 37/20* (2006.01)
*F16K 15/00* (2006.01)

(52) U.S. Cl. ..... 239/547; 239/551; 239/562; 137/516.25

(58) Field of Classification Search ............... 239/533.1, 239/542, 547, 550, 551, 556, 560, 561, 562, 239/565; 137/883, 561 R, 118.06, 516.27, 137/516.25

See application file for complete search history.

(56) References Cited

U.S. PATENT DOCUMENTS

| | | | | |
|---|---|---|---|---|
| 3,736,755 A | * | 6/1973 | Hammond et al. | ............. 405/37 |
| 3,908,694 A | | 9/1975 | Spears | |
| 4,423,838 A | * | 1/1984 | Dinur | ................ 239/1 |
| 5,163,622 A | * | 11/1992 | Cohen | ............................ 239/542 |
| 5,203,503 A | * | 4/1993 | Cohen | ................................. 239/1 |
| 5,615,383 A | | 3/1997 | Caudel et al. | |
| 5,829,686 A | * | 11/1998 | Cohen | .......................... 239/533.1 |
| 5,857,624 A | * | 1/1999 | Lee | .............. 239/284.1 |
| 6,027,048 A | * | 2/2000 | Mehoudar | ...................... 239/542 |
| 6,207,048 B1 | | 3/2001 | Bonelli | |
| 6,250,571 B1 | * | 6/2001 | Cohen | ............................ 239/542 |
| 6,308,902 B1 | | 10/2001 | Huntley | |
| 6,402,052 B1 | * | 6/2002 | Murawa | ...................... 239/284.1 |
| 2006/0163388 A1 | * | 7/2006 | Mari | .............................. 239/542 |
| 2006/0237561 A1 | * | 10/2006 | Park et al. | ...................... 239/542 |

FOREIGN PATENT DOCUMENTS

| | | |
|---|---|---|
| AU | 492484 | 9/1975 |
| WO | WO 01/64019 | 9/2001 |
| WO | WO/2007/074428 | 7/2007 |

OTHER PUBLICATIONS

International Search Report PCT/IL2007/001023, mailing date Dec. 12, 2007.

* cited by examiner

*Primary Examiner* — Len Tran
*Assistant Examiner* — Justin Jonaitis
(74) *Attorney, Agent, or Firm* — Womble Carlyle (57) ABSTRACT

An irrigation pipe comprising: at least one first integrated emitter characterized by a first discharge-pressure threshold; at least one second integrated emitter characterized by a second discharge-pressure threshold different from the first discharge-pressure threshold threshold; wherein, the at least one first and at least one second integrated emitters are positioned along the pipe in accordance with a predetermined configuration.

18 Claims, 10 Drawing Sheets

IRRIGATION PIPE

CROSS REFERENCE TO RELATED APPLICATIONS

This application claims priority under 35 U.S.C. 119(a) from Israeli Application 177552, filed on Aug. 17, 2006. The entire disclosure of this application is incorporated herein by reference,

FIELD OF THE INVENTION

The invention relates to irrigation pipes, in particular irrigation pipes installed with a plurality of emitters

BACKGROUND OF THE INVENTION

Irrigation systems that deliver water, often containing plant nutrients, pesticides and/or medications, to plants via networks of irrigation pipes are very well known. In many such irrigation networks, water from the pipes is delivered to the plants by "emitters" or "drippers", hereinafter generically referred to as emitters, that are installed on or "integrated" inside the irrigation pipes Emitters that are integrated inside an irrigation pipe are conventionally referred to as "integrated" emitters. Generally, the integrated emitters in a given irrigation pipe are equidistant from each other and each provides a substantially same flow rate of water for a same given water pressure in the pipe. However, integrated emitters in an irrigation pipe are not necessarily the same and equidistant from each other. Distances between emitters and emitter characteristics installed in a pipe may be adapted at the factory to particular requirements of a location at which the pipe is to be used and the conditions under which the pipe is to be used at the location.

For example, U.S. Pat. No. 6,308,902, the disclosure of which is incorporated herein by reference, describes a drip irrigation hose for irrigating plants comprising a plurality of integrated emitters having different discharge rates that are "manufactured into the hose". The emitters have at least two different geometries that provide different resistances to water flow. Locations of the emitters along the pipe are determined so that emitters that are characterized by larger resistance to water flow are located at positions along the pipe that are subject to higher water pressure and emitters characterized by lower resistance to water flow are located at positions subject to lower water pressure. For example, assume that an irrigation pipe is to be used to irrigate plants in a relatively flat field. Higher resistance emitters are positioned along the pipe relatively close to an input end of the pipe, which is connected to a water source that provides water to the pipe and where water pressure is relatively high and close to the water inlet pressures Lower resistance emitters are positioned at locations relatively far from the water source at locations where water pressure is reduced relative to the inlet pressure because of resistance of the pipe to water flow. By positioning the emitters in this manner, flow rate of water provided by the pipe to irrigate the plants tends to be relatively uniform along the pipe length.

U.S. Pat. No. 4,423,838, the disclosure of which is incorporated herein by reference, describes "a custom designed topographically matched irrigation line" comprising "a multiplicity of liquid discharge means" that has desired water output characteristics along the length of the line. "The desired output characteristics are provided by "varying the periodicity of the discharge elements therealong varying the flow rates of the individual discharge elements or both in any desired combination."

Whereas irrigation pipes configured to specific terrains and conditions for which they are to be used are beneficial, irrigation requirements, even over a same terrain, generally change over time, as, for example, crops in a field or terraced garden mature and/or their density in the field or garden changes A given configuration of emitters, even when tailored to meet the needs of a particular terrain and irrigation application can often not meet needs or the terrain and application as the needs change over a growing season. Typically, to meet changing needs during a growing season, a user of irrigation pipes will procure pipes having a density of emitters per unit length of pipe that is too high for an initial irrigation application for which the pipe is used. Some of the emitters are removed from operation by blocking, e g. by taping, their outputs to adapt the pipe to initial use Subsequently, in the event that the pipe is required to provide increased quantities of water, the blocked emitters are unblocked. Alternatively, a pipe may be procured with a quantity of emitters sufficient for an initial use requiring a relatively small provision of water. As demand for water increases, additional emitters are added, for example by coupling on-line emitters (emitters coupled externally to an irrigation pipe via holes that are often formed in the pipe wall using special tools) or self-puncturing emitters to the irrigation pipe. By way of example, self puncturing emitters are described in PCT Application PCT/IL2005/001382 entitled "Fluid Flow Control Regulator", the disclosure of which is incorporated herein by reference.

U.S. Pat. No. 6,027,048, the disclosure of which is incorporated herein by reference, describes an integrated irrigation emitter suitable for integration in an irrigation pipe that has a non-return feature that seals the emitter against backflow of water and air into the pipe when pressure of water in the pipe falls below a predetermined level. The non-return feature reduces the frequency with which the emitters become clogged with dirt and debris carried by water and/or air backflow. Water and/or air backflow typically occurs when supply of water to irrigation pipes providing water to plants in a field or hothouse is turned off and pressure in the pipes falls. For subsurface drip irrigation (SDI) pipes, which are buried in the ground or a growing medium, particulate matter in the surrounding soil or growing medium tends to be drawn into and clog emitters in the pipes when water pressure in the pipes falls For above surface drip irrigation, backflow tends to clog emitters by drawing into the emitters particulate matter in mud and dust in environments in which the emitters often are located.

U.S. Pat. No. 5,615,838, the disclosure of which is incorporated herein by reference, describes integrated emitters, referred to as in-line emitters, that have a non-return feature and optionally provides a regulated flow of water. In an embodiment of the invention a flexible membrane closes the emitter to flow into or out of the emitter when inlet pressure to the emitter falls below a minimum pressure. The membrane optionally functions to control a length of a labyrinth through which water flows responsive to inlet pressure to regulate flow of water provided by the emitter. The patent notes that the "structures defining how and under what pressures the valves operate also can be readily varied".

Whereas non-return irrigation emitters reduce probability of clogging as a result of their advantageous anti-clogging characteristic, when water supply to an irrigation pipe in which they are installed is turned off, they seal the pipe against ingress of air and prevent water in the pipe from draining out. As a result, storing the pipe after use or moving the pipe from one venue to another can require a relatively tedious draining process If water is drained from a far end of the pipe, for example from an end far from a water source to which the pipe is coupled, as the water drains, vacuum is created in the pipe that causes the pipe to collapse and fold in on itself. When the pipe collapses, not only is there a tendency for the pipe walls and emitters in the pipe to sustain damage but the collapse is not uniform, causing substantial variation in the shape and diameter of the pipe along its length. If the pipe is rolled up onto a spool, as is often the case after use during a growing season or in order to move the pipe from one field to another, "winding" of the pipe onto the spool is not uniform and tends to be tangled. Subsequently, when the irrigation pipe is unrolled from the spool, the non-uniform winding and tangles tend to make it difficult to unroll and lay the pipe evenly on the ground and/or tend to cause the pipe to "catch" and get caught on the spool during unrolling. If the pipe is unrolled by tractor, the jumbled winding and tangles generally make the task tedious and time consuming and if the pipe catches, can result in the pipe tearing or being otherwise damaged

SUMMARY OF THE INVENTION

An aspect of some embodiments of the invention relates to providing an irrigation pipe having a configuration of emitters that are controllable to be turned on and turned off to provide different predetermined desired quantities and/or spatial distributions of water to plants by controlling inlet water pressure to the pipe.

In accordance with an embodiment of the invention, at least two of the integrated emitters coupled to the pipe have different water discharge pressure thresholds, hereinafter "discharge-pressure thresholds". At least one of the discharge-pressure thresholds may be substantially zero If water pressure, hereinafter "local pressure" at the location of an emitter in the pipe is less than the emitter's characteristic discharge pressure-threshold, the emitter will not discharge water from the pipe. On the other hand, if local water pressure is greater than the emitter's discharge-pressure threshold, the emitter will divert and discharge water from the irrigation pipe. One of the at least two emitters is controllable to discharge water from the pipe while the other doesn't discharge water by controlling pressure, hereinafter "pipe inlet-pressure", provided to the pipe, so that at the location of one of the two emitters local water pressure is lower than the emitter's discharge-pressure threshold while at the location of the other emitter, the local pressure is greater than the emitter's discharge-pressure threshold. The discharge-pressure thresholds of the at least two emitters and their positions are determined so that by controlling inlet-pressure to the pipe, different predetermined spatial configurations and/or amounts of water can be provided to a growing environment.

For example, an irrigation pipe, in accordance with an embodiment of the invention, may be fit with a same, repeated configuration of emitters having different discharge-pressure thresholds so that a number of emitters per unit length of the pipe that provide water can be controlled by the inlet pressure to the irrigation pipe and the number is the same substantially independent of location along the pipe Or, by way of further example, different portions of the irrigation pipe may be characterized by different repeated configurations of emitters having different discharge-pressure thresholds. As a result, a number of emitters that provide water per unit length of pipe is controllable by the pipe input pressure but the number may be controlled to be different for the different portions of the pipe.

The integrated emitters in an irrigation pipe in accordance with an embodiment of the invention, may be any integrated emitter known in the art suitable for internal mounting in an irrigation pipe that can be provided having different discharge-pressure thresholds. Any of various methods known in the art for inserting emitters into an irrigation pipe may be adapted to mount emitters having different discharge-pressure thresholds in the irrigation pipe, in accordance with an embodiment of the invention Optionally, the emitters are similar to emitters described in U.S. Pat. No. 5,615,838 referenced above.

An aspect of some embodiments of the invention relates to providing an integrated emitter, hereinafter a "bipolar" emitter, characterized not only by a discharge-pressure threshold at which the emitter begins to discharge water from an irrigation pipe but also by an "arrest-pressure threshold", greater than the discharge-pressure threshold, at which the emitter ceases discharging water. If, after local pressure at the emitter exceeds the discharge-pressure threshold and the emitter begins discharging water from the irrigation pipe, the local pressure exceeds the arrest-pressure threshold, the emitter stops discharging water from the irrigation pipe.

In an embodiment of the invention, a bipolar emitter comprises a diaphragm, which at a first position blocks entry of water into the emitter until local water pressure at the emitter is greater than a discharge-pressure threshold and at a second position blocks exit of water from the emitter if the local pressure exceeds an arrest-pressure threshold. To block exit of water at the second pressure, in accordance with an embodiment of the invention, the diaphragm seats stably to on an exit port of the emitter to substantially seal the port against egress of water as long as the local pressure exceeds the arrest-pressure threshold Optionally, the bipolar emitter is a regulated emitter that provides a substantially same output flow of water for any local pressure between the discharge and arrest threshold-pressures of the emitter.

An aspect of some embodiment of the invention relates to providing an irrigation pipe comprising at least one integrated bipolar emitter. An irrigation pipe comprising an integrated bipolar emitter provides enhanced flexibility in controlling water discharged from an irrigation pipe by controlling inlet-pressure to the pipe.

An aspect of some embodiments of the invention relates to providing a "self emptying" irrigation pipe comprising a plurality of non-return emitters and at least one emitter, hereinafter referred to as a "free-flow" emitter, that has a discharge-pressure threshold substantially equal to zero and is not a non-return emitter. Free-flow emitters discharge water from an irrigation pipe for substantially all positive water pressures inside the pipe and enable air to enter the pipe when the pipe is being emptied. As a result, the pipe readily self empties of liquid when water to the pipe is shut off and does not develop an internal vacuum that collapses the pipe as the water leaves.

There is therefore provided in accordance with an embodiment of the present invention an irrigation pipe comprising: at least one first integrated emitter characterized by a first discharge-pressure threshold; at least one second integrated emitter characterized by a second discharge-pressure threshold different from the first discharge-pressure threshold;

wherein the at least one first and at least one second integrated emitters are positioned along the pipe in accordance with a predetermined configuration.

Optionally, at least one of the integrated emitters is characterized by an arrest-pressure threshold and wherein the emitter does not discharge water if the arrest-pressure threshold is exceeded by local water pressure in the pipe at the location of the emitter. Additionally or alternatively the irrigation pipe comprises at least one integrated free-flow emitter, which is not a non-return emitter.

There is further provided in accordance with an embodiment of the invention, an irrigation pipe comprising: a plurality of non-return integrated emitters each having a discharge-pressure threshold; and at least one integrated free-flow emitter that is not a non-return emitter.

In an embodiment of the invention, the irrigation pipe comprises at least one free-flow emitter for every ten non-return emitters. Optionally, the irrigation pipe comprises at least one free-flow emitter for every five non-return emitters. Optionally, the irrigation pipe comprises at least one free-flow emitter for every three non-return emitters. Optionally, the irrigation pipe comprises substantially a same number of free-flow emitters and non-return emitters. In some embodiments of the invention, the free-flow emitters are positioned in the pipe in accordance with a predetermined configuration. In some embodiments of the invention, the free-flow emitters are randomly positioned in the pipe.

There is further provided in accordance with an embodiment of the invention, an emitter comprising: a water inlet port that is sealed against ingress of water for water pressure at the inlet port less than a discharge-pressure threshold; and an outlet port that remains stably sealed against egress of water for water pressure at the inlet port greater than an arrest-pressure threshold.

Optionally the emitter comprises an elastic diaphragm having a first side that seats on and seals the inlet port against ingress of water for water pressure at the inlet port less than the discharge-pressure threshold and a second side that seats stably on and seals the outlet port against egress of water for water pressure at the inlet port greater than the arrest-pressure threshold.

In an embodiment of the invention, the outlet port is made sufficiently large so that stable seating of the diaphragm on the outlet port is maintained by a difference between force generated by atmospheric pressure on a surface area of the second side of the diaphragm exposed to the atmosphere when the diaphragm seats on the outlet port and force generated by water pressure on a substantially equal area on the first side of the diaphragm.

There is further provided an irrigation pipe comprising an emitter in accordance with an embodiment of the invention.

In an embodiment of the invention, the discharge-pressure threshold of at least one emitter is substantially zero.

There is further provided in accordance with an embodiment of the invention, an irrigation system comprising: an irrigation pipe according to any of the preceding claims; a source of water coupled to the irrigation pipe that is controllable to provide water at different inlet pressures to the irrigation pipe so that different configurations of the at least one first and at least one second emitters may be activated to discharge water from the irrigation pipe. Optionally, the irrigation system comprises a controller that controls the source of water to provide water at different desired inlet pressures to the irrigation pipe corresponding to different configurations of activated and non-activated emitters.

There is further provided in accordance with an embodiment of the invention, a method of producing an irrigation pipe comprising: providing a pipe having an internal lumen; mounting a plurality of integrated emitters to the pipe wall inside the lumen in accordance with a predetermined configuration; wherein at least two of the emitters have different discharge-pressure thresholds.

There is further provided in accordance with an embodiment of the invention, method of irrigating plants comprising: providing at least one irrigation pipe in accordance with any of the preceding to irrigate the plants; and controlling inlet pressure to the at least one irrigation pipe to provide different configurations of activated and non-activated emitters of the plurality of emitters.

BRIEF DESCRIPTION OF FIGURES

Non-limiting examples of embodiments of the present invention are described below with reference to figures attached hereto In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. The figures are listed below.

FIGS. 3A and 39 schematically show an irrigation pipe comprising integrated bipolar emitters operating under different inlet pressures, in accordance with an embodiment of the invention;

DETAILED DESCRIPTION OF EXEMPLARY EMBODIMENTS

Figure 1:
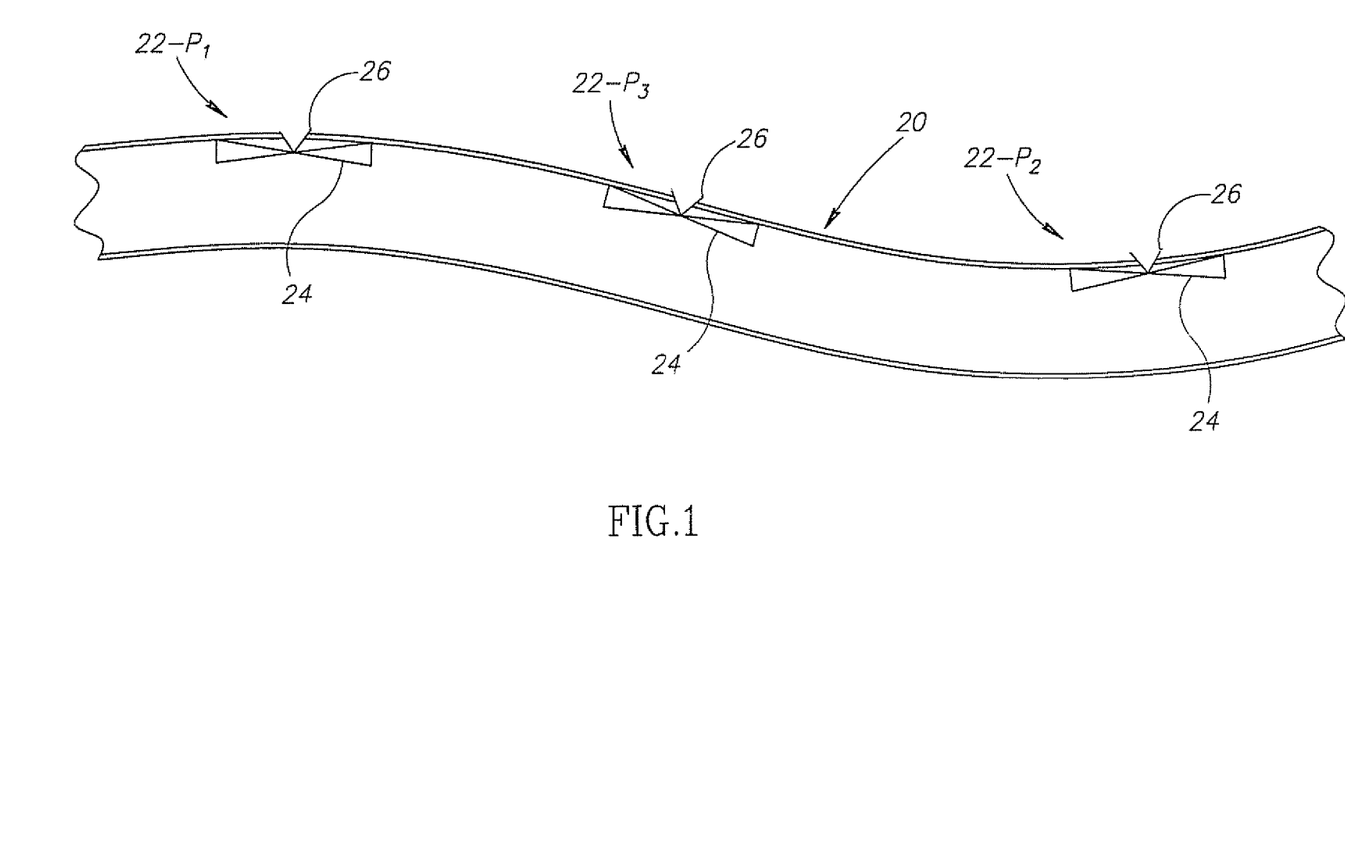
FIG. 1 schematically shows an irrigation pipe having optionally internally mounted emitters that discharge water for different inlet pressures, in accordance with an embodiment of the invention.

FIG. 1 schematically shows a portion of an irrigation pipe 20 having an internal lumen or cavity and comprising a predetermined configuration of a plurality of integrated emitters having different discharge-pressure thresholds, in accordance with an embodiment of the invention.

Integrated emitters in pipe 20 are labeled by an alphanumeric designation comprising the number 22 followed by a dash and an indexed letter "$P_i$," that indicates their respective discharge-pressure thresholds. Emitters characterized by discharge pressures $P_i$ having a same value for the index i have same discharge-pressure thresholds and emitters characterized by pressures $P_i$ having different index have different discharge-pressure thresholds. The emitters are referred to generically by the number 22 and are, for example, referenced by the number 22 when discussing features shared by all the emitters. In accordance with an embodiment of the invention, at least two emitters mounted to an irrigation pipe have different discharge-pressure thresholds $P_i$. Presence of at least two emitters having different threshold pressures allows different numbers of the emitters in the irrigation pipe to be turned on to discharge water by controlling the inlet water pressure to the irrigation pipe.

By way of example, the portion of irrigation pipe 20 shown in the figure comprises three emitters, 22-$P_1$, 22-$P_2$ and 22-$P_3$, coupled to the inside wall of irrigation pipe 20. Each emitter "22" comprises an emitter body schematically represented by a "bowtie" 24 that is immersed in water flowing in the irrigation pipe and discharges a portion of the water through an output orifice schematically represented by a "funnel" 26 if the water pressure, i e "local pressure", at the location of the emitter in the pipe is greater than the emitter's discharge-pressure threshold Optionally at least one of emitters 22 is a non-return emitter that is "self sealing" and prevents backflow of water and/or air into the emitter when local pressure falls below the discharge-pressure threshold of the emitter. Optionally, at least one emitter 22 is a regulated emitter that provides a regulated flow of water for substantially any pressure in an operating input pressure range of the emitter greater than its discharge-pressure threshold $P_i$.

Figure 2A:
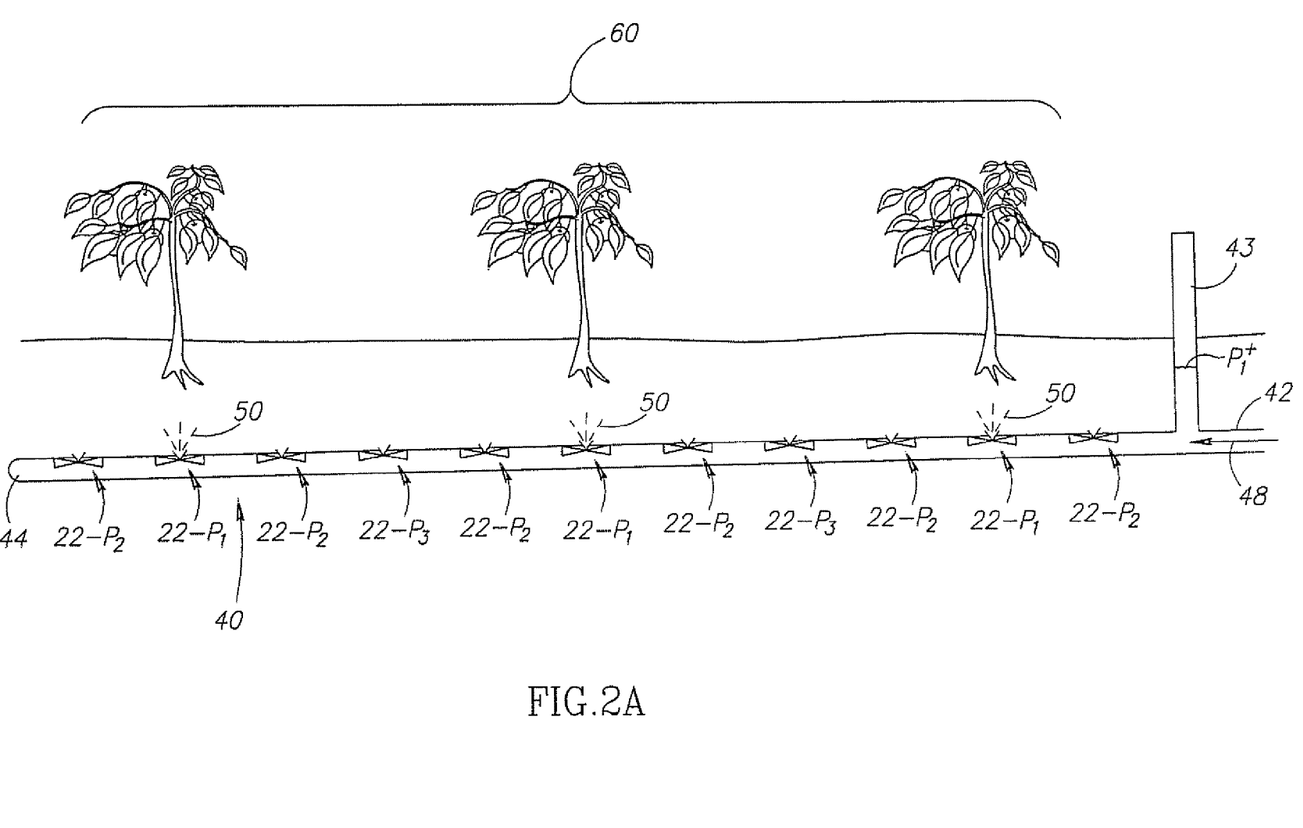
FIGS. 2A-2C schematically show the irrigation pipe shown in FIG. 1 being operated under different pipe inlet water pressures to irrigate a tree nursery orchard and provide different quantities of water to trees in the orchard, in accordance with an embodiment of the invention.
Figure 2B:
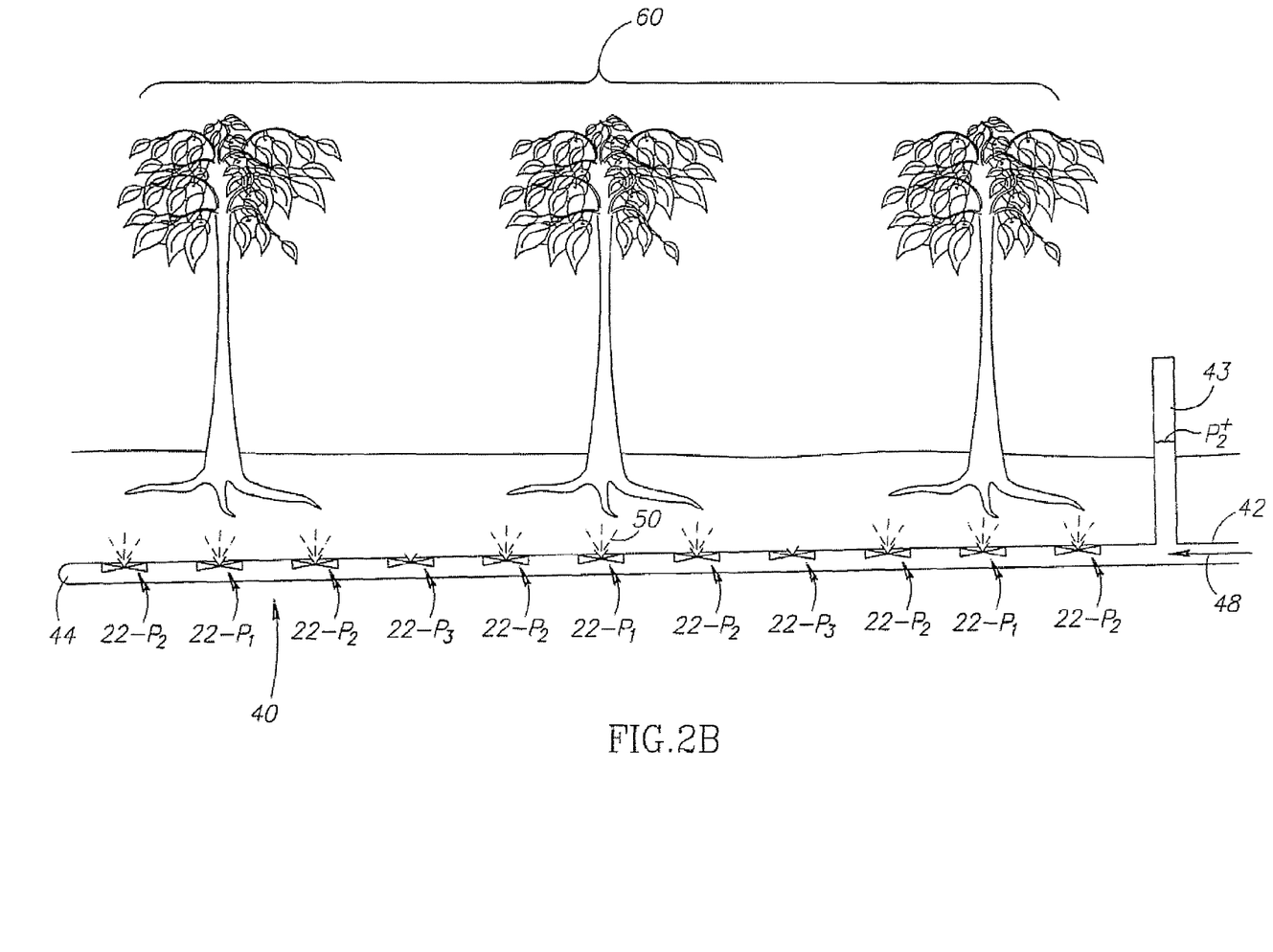
Figure 2C:
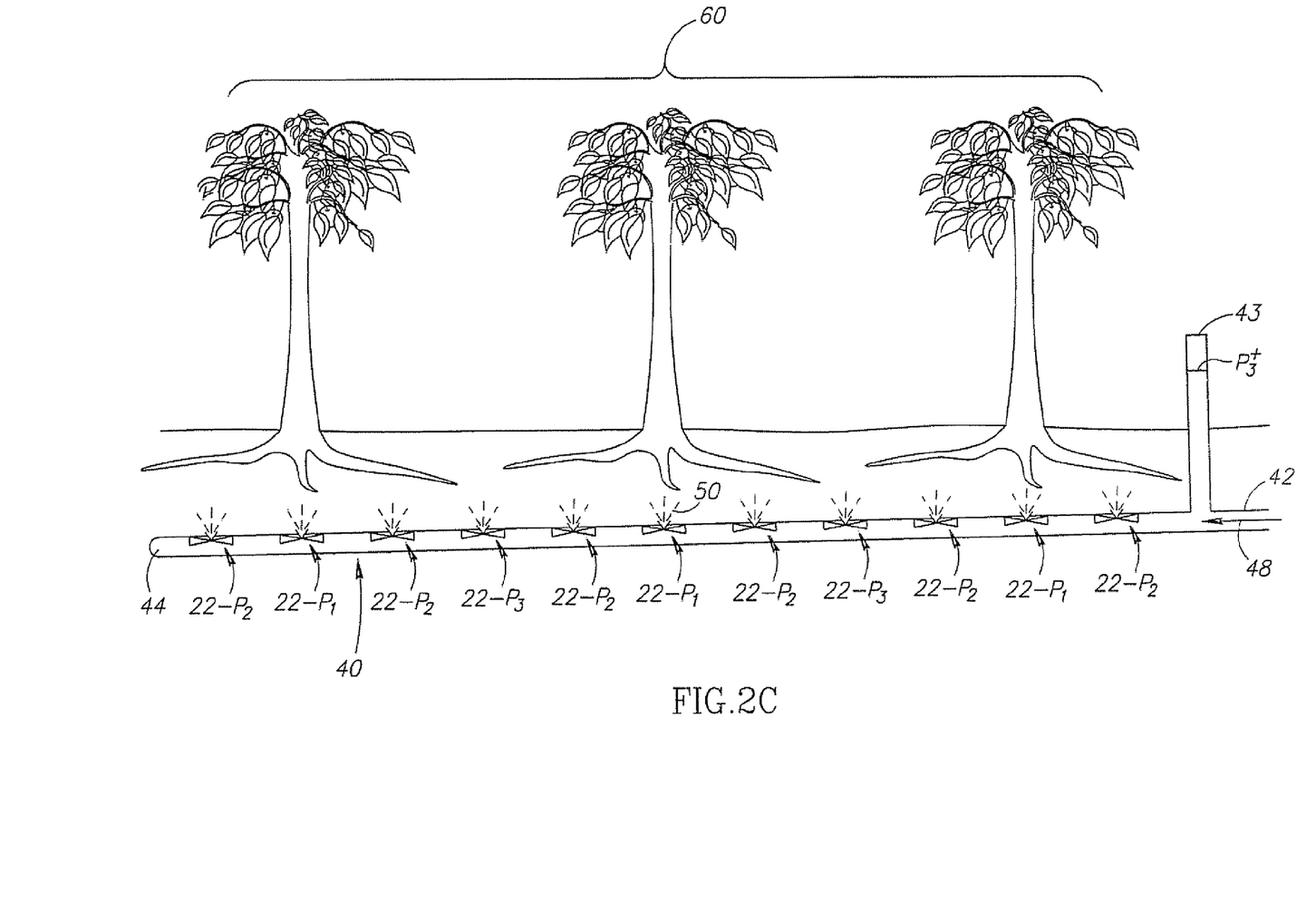

FIGS. 2A-2C schematically illustrate operation of an irrigation pipe 40 having a pipe inlet 42 and an end 44 that provides water to irrigate an orchard 60 of growing fruit trees, in accordance with an embodiment of the invention. Irrigation pipe 40 optionally lies on top of the ground. For simplicity and convenience of presentation the terrain of orchard 60 is assumed to be such that irrigation pipe 40 is substantially horizontal with a slight tilt downward in a direction away from inlet 42 so that end 44 is lower than the inlet.

By way of example, irrigation pipe 40 comprises integrated non-return emitters 22-$P_1$, 22-$P_2$ and 22-$P_3$, characterized by discharge-pressure thresholds $P_1$, $P_2$ or $P_3$ that satisfy a relation $P_1 < P_2 < P_3$. Optionally, emitters 22-$P_1$ are regulated emitters, each providing a regulated desired output flow of water for a pressure in an operating range of pressures greater than the emitter's respective discharge-pressure threshold. As with respect to the discussion of FIG. 1, emitters comprised in the irrigation pipe are referred to generically by the number 22.

In accordance with an embodiment of the invention, discharge pressure thresholds $P_1$, $P_2$ and $P_3$ of integrated emitters 22 and/or the respective positions of the emitters along irrigation pipe 40 are determined to provide appropriate irrigation to trees in orchard 60 as the orchard matures By way of example, emitters 22 are configured along irrigation pipe 40 so that a low discharge-pressure threshold emitter, i e an emitter labeled 22-$P_1$ is located close to where each young sapling is planted. Optionally, each low discharge-pressure threshold emitter is flanked on either side by a moderate discharge-pressure threshold emitter 22-$P_2$. Optionally, a high discharge-pressure threshold emitter 22-$P_3$ is sandwiched between two moderate discharge-pressure threshold emitters 22-$P_2$. By way of numerical example, pressures $P_1$, $P_2$ and $P_3$ may be determined to satisfy the following relationships: $0 < P_1 < 10$ m; $10 m < P_2 < 20$ m and $20 < P_3 < 30$ m, where bounds on pressure are given in meters of water above atmospheric pressure A suitable water supply source (not shown), such as for example a pump and/or raised water reservoir, provides water schematically indicated by arrow 48 to irrigation pipe 40 at pipe inlet 42 and at a pressure indicted by a schematic manometer 43.

In FIG. 2A the trees in orchard 60 are assumed to be new, just planted, saplings whose roots are spaced relatively far apart. It is assumed that an amount of water that flows out of a low discharge-pressure threshold emitter 22-$P_1$ located closest to a sapling is sufficient to properly irrigate the sapling for a first period of its growth Accordingly, in an embodiment of the invention, the water source that provides water to irrigation pipe 40 provides water at a pipe inlet pressure $P^+_1$ which satisfies the relationship $(P_1+\Delta) \leq P^+_1 < P_2$. The parameter $\Delta$ is a pressure margin that accounts for decrease in pressure in irrigation pipe 40 with distance along the pipe from inlet 42 as a result of resistance to flow in the pipe and discharge of water by emitters that are turned on Pressure $P^+_1$ is indicated in manometer 43. As a result of satisfying the above noted inequality, at inlet pressure $P^+_1$, only low discharge-pressure threshold emitters 22-$P_1$ are turned on to provide water for the trees in the orchard. Emitters 22 that are turned on are schematically indicated as providing water by a "water spray" 50 emanating form the emitters' output orifices 26.

In FIG. 2B it is assumed that the saplings have grown and their roots have spreads. It is assumed that the saplings can no longer be properly irrigated by an amount of water provided from a single emitter 22 and in accordance with an embodiment of the invention the water source is controlled to provide water to irrigation pipe 40 at a pipe inlet pressure $P^+_2$, which satisfies the relationship $(P_2+\Delta) \leq P^+_2 < P_3$. As a result, low discharge-pressure emitters 22-$P_1$ and moderate discharge-pressure threshold emitters 22-$P_2$ are turned on and provide water to the trees. By way of example, each tree in orchard 60 is now provided by water from three emitters 22.

In FIG. 2C the trees are assumed to have grown to such an extent that they cannot be properly irrigated by water only from low and moderate discharge-pressure threshold emitters 22-$P_1$ and 22-$P_2$. The water source is therefore controlled to provide water to irrigation pipe 40 at a pressure $P^+_3$, which is greater than or equal to $(P_3+\Delta)$. At pressure $P^+_3$ not only do the low and moderate discharge-pressure threshold emitters provide water to irrigate the trees but high discharge-pressure threshold emitters 22-$P_3$ are also turned on to provide water to the trees.

By way of example, emitters 22 in irrigation pipe 40 are characterized by respective discharge-pressure thresholds and the emitters are configured to irrigate an orchard 60 of growing sapling fruit trees with different quantities and spatial distributions of water as the saplings mature. Besides an option of all emitters 22 being off, and no water being provided to the orchard, irrigation pipe 40 offers tree additional, different configurations of on and off emitters 22: only emitters 22-$P_1$ on; only emitters 22-$P_1$ and 22-$P_2$ on; and all emitters 22 on, i.e. 22-$P_1$ and 22-$P_2$ and 22-$P_3$ on.

In some embodiments of the invention, an irrigation pipe comprises at least one bipolar emitter that is characterized not only by a discharge-pressure threshold but also an arrest-pressure threshold Whereas when local water pressure at the emitter exceeds the discharge-pressure threshold, the emitter discharges water from the irrigation pipe, when subsequently local pressure exceeds the arrest-pressure threshold, the emitter ceases to discharge water from the pipe. An irrigation pipe comprising a bipolar emitter generally provides a greater range of irrigation options than a similarly configured irrigation pipe that does not comprise a bipolar emitter.

Figure 3A:
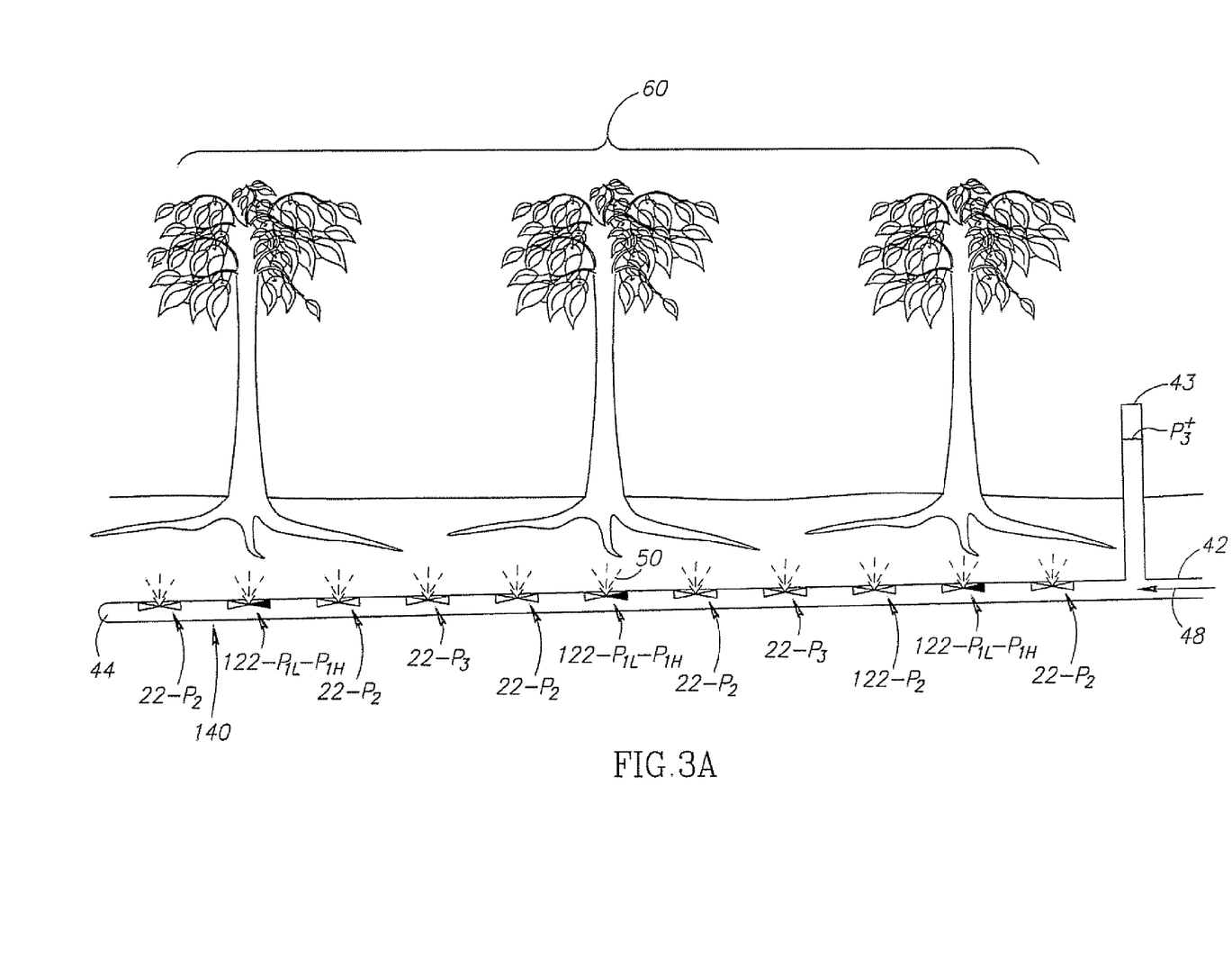
Figure 3B:
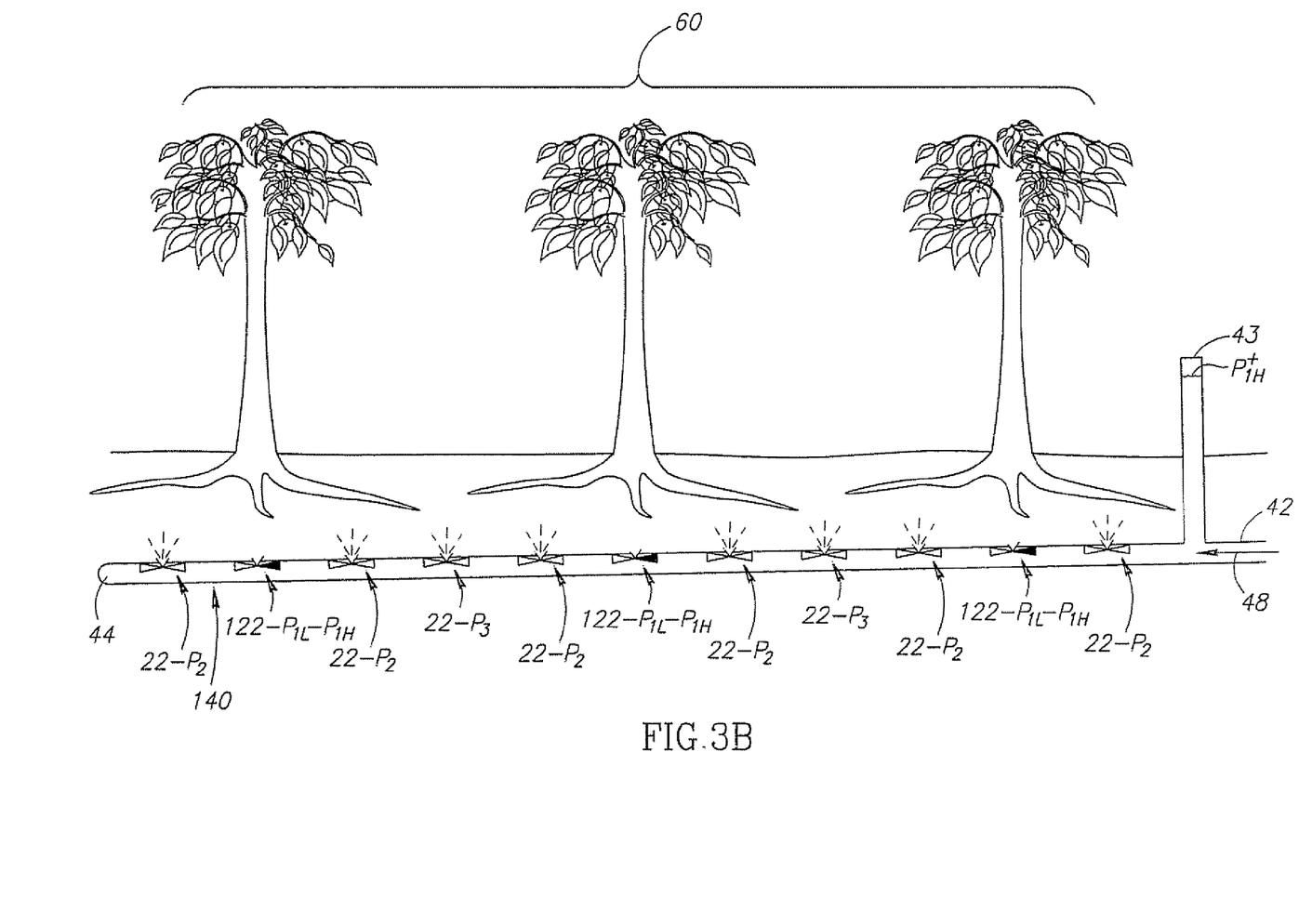

By way of example FIGS. 3A and 3B schematically show an irrigation pipe 140 similar to irrigation pipe 40, but in which emitters 22-$P_1$ in pipe 40 are replaced by bipolar emitters in pipe 140. The bipolar emitters in pipe 140 are indicated by an icon having a "black and white" bowtie and an alphanumeric 122-$P_{1L}$-$P_{1H}$. $P_{1L}$ in the alphanumeric designation indicates the "low" discharge-pressure threshold of the emitter and $P_{1H}$ the "high" arrest-pressure threshold of the emitter For purposes of illustration it is assumed that $P_{1H} > (P_3+\Delta) = P_3^+$.

Irrigation pipe 140 operates similarly to irrigation pipe 40 for all inlet pressures up to $(P_3+\Delta)$ and provides the three "on-off" options provided by irrigation pipe 40. However, the incorporation of bipolar emitters 122-$P_{1L}$-$P_{1H}$ in irrigation pipe 140 provides the irrigation pipe with an additional configuration of on and off emitters that is not available to irrigation pipe 40. Inlet pressure to irrigation pipe 140 can be controlled so that only emitters 22-$P_2$ and 22-$P_3$ provide water to orchard 60. If inlet pressure to irrigation pipe 140 is set to $P_{1H}^+=(P_{1H}+\Delta)$, emitters 122-$P_{1L}$-$P_{1H}$ will not provide water to orchard 60 and only emitters 22-$P_2$ and 22-$P_3$ will irrigate the orchard FIG. 3A schematically shows inlet pressure to irrigation pipe 140 at a pressure $(P_3+\Delta)$, which is less than $P_{1H}$, and, as for irrigation pipe 40 at inlet pressure $(P_3+\Delta)$ (FIG. 2C), all emitters 122 in irrigation pipe 140 are discharging water to orchard 60. If however, as shown in FIG. 3B, inlet pressure to irrigation pipe 140 is set to $P_{1H}^+=(P_{1H}+\Delta)$, emitters 122-$P_{1L}$-$P_{1H}$ cease providing water to orchard 60 and only emitters 22-$P_2$ and 22-$P_3$ irrigate the orchard.

It is noted that FIGS. 3A and 3B schematically show a particular exemplary irrigation pipe comprising bipolar emitters. Configurations of irrigation pipes comprising integrated bipolar emitters other than the configuration shown in FIGS. 3A and 3B are of course possible, will readily occur to a person of the art and can be useful in various situations.

In accordance with an embodiment of the invention a bipolar integrated emitter comprises a diaphragm that controls water flow through the emitter. The diaphragm permits water to enter the emitter through an emitter inlet port only if the local water pressure is greater than a given discharge-pressure threshold and prevents water from exiting the emitter through an outlet port if local pressure is greater than an arrest-pressure threshold. If pressure is less than the discharge-pressure threshold, the diaphragm seals the inlet port against ingress of water. If the local pressure is greater than an arrest-pressure threshold, the diaphragm seals the outlet port against egress of water.

Figure 4A:
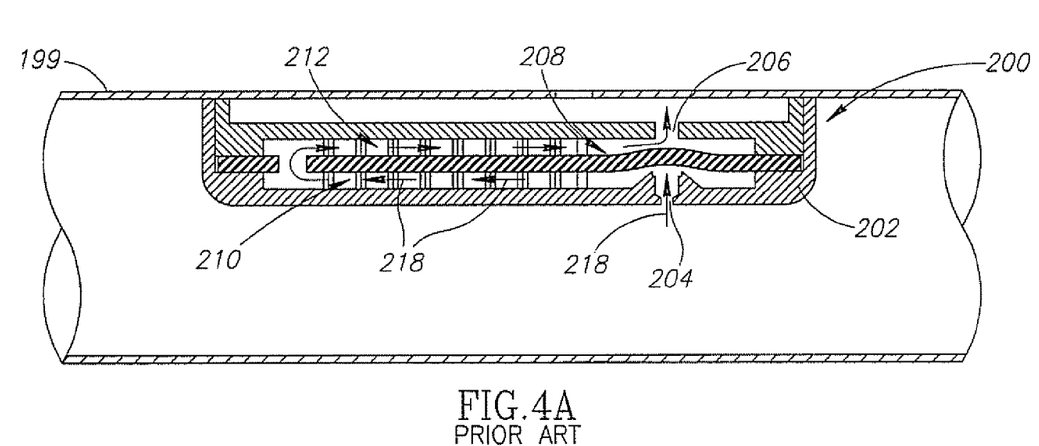
FIG. 4A schematically shows a conventional integrated emitter.

FIG. 4A schematically shows a cross section view of an integrated emitter 200 installed in an irrigation pipe 199 in accordance with the prior art. Emitter 200 comprises a frame 202 having an inlet port 204 and an outlet port 206 and an elastic diaphragm 208 having a portion located between the inlet and outlet ports. Diaphragm 208 is seated between an inlet labyrinth 210 and an outlet labyrinth 212 and is formed with a water flow aperture 214 that communicates with both the inlet and outlet labyrinth.

When local water pressure is less than the discharge-pressure threshold of emitter 200, diaphragm 208 seats on inlet port 204 and seals the port against water ingress. When water exceeds the discharge-pressure threshold, a pressure differential develops between the inlet side of diaphragm 208 and its outlet side. The pressure differential stretches diaphragm 208 to unseat from inlet port 204 and let water enter the emitter, flow through inlet and outlet labyrinths 210 and 212 and exit the emitter from outlet port 206. Labyrinths 210 and 212 function to control an amount of water flow through the emitter by providing a desired resistance to water flow. FIG. 4A schematically shows emitter 200 when local water pressure at the emitter is greater than the emitter's discharge-pressure threshold. Arrows 218 indicate water flow through the emitter.

If local pressure increases to such a degree that a pressure differential between opposite sides of diaphragm 208 stretches the diaphragm to seal outlet port 206, water will cease to flow through the emitter. However, cessation in flow is only momentary since when water flow is stopped, water pressure in inlet and outlet labyrinths 210 and 212 equalizes and pressure on both sides of diaphragm 208 becomes the same. As a result, diaphragm 208 contracts back towards its outstretched state, falls away from outlet port 206 and unseals the outlet port allowing water to resume flowing through the emitter.

Assuming that the local water pressure at inlet port 204 does not change, once water resumes flowing through emitter 200, the pressure differential that caused diaphragm 208 to seal outlet port 206 is reestablished and the diaphragm will again seal the outlet port. In general, the "fibrillation" cycle of sealing and unsealing outlet port 206 will repeat, causing the emitter to repeatedly emit pulses of water. Conventional integrated emitter 200 therefore does not have a stable, effective arrest pressure. It is noted that to prevent fibrillation, as described above, some prior art emitters similar to emitter 200 have a "bleed" channel (not shown) that communicates with outlet port 206 and faces diaphragm 208. The bleed channel is formed so that if diaphragm 208 seats on outlet port 206, the diaphragm does not seal the bleed channel and a relatively small amount of water in outlet labyrinth 212 continues to flow from the labyrinth, through the bleed channel and trickle out of the emitter through outlet port 206.

Figure 4B:
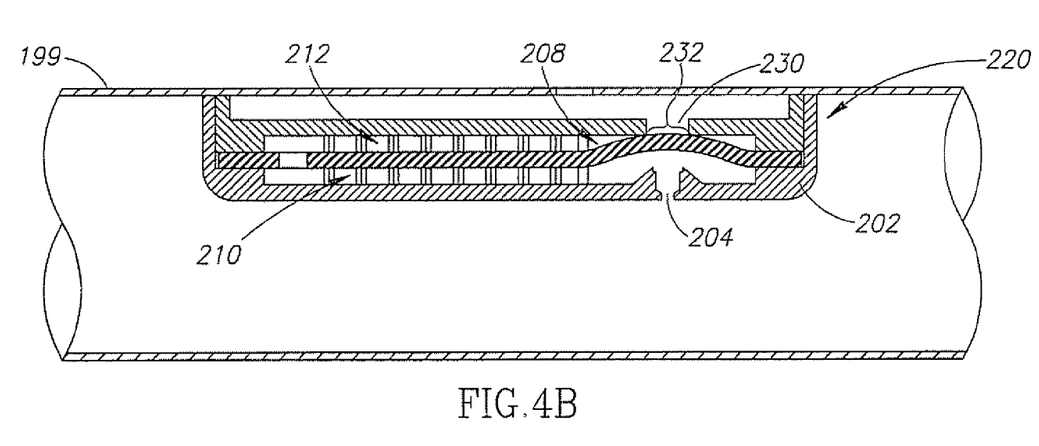
FIG. 4B schematically shows a bipolar integrated emitter in a high pressure closed state, in accordance with an embodiment of the present invention.

FIG. 4B schematically shows an integrated emitter 220 having an arrest-pressure threshold, in accordance with an embodiment of the invention Emitter 220 has many of the same features as conventional emitter 200 and comprises a frame 202 having an inlet port 204 and an elastic diaphragm 208 seated between an inlet and outlet labyrinth 210 and 212. Optionally emitter 220 has a same discharge-pressure threshold as conventional emitter 200.

However, in accordance with an embodiment of the invention, emitter 220 is formed with a relatively large outlet port 230. As a result, when local water pressure distorts diaphragm 208 to seal the outlet port, and water pressure on both sides of the diaphragm equalizes, a relatively large area 232 on the output labyrinth side of the diaphragm covers outlet port 230 and is exposed to atmospheric pressure. The atmospheric pressure is generally substantially less than the local water pressure and therefore the water pressure on both sides of diaphragm 208 (i.e. the labyrinth 210 side and the labyrinth 212 side of the diaphragm) when the diaphragm is distorted to seat on and seal outlet port 230. A difference between the atmospheric pressure on area 232 and the water pressure on an equal size area on the inlet labyrinth side of diaphragm 208 generate a net "seating" force that tends to keep diaphragm seated on port 230. In accordance with an embodiment of the invention, outlet port 230 and therefore area 232 are made sufficiently large so that for a desired range of local water pressures, the seating force opposes and is greater than elastic forces of stretched diaphragm 208 that tend to return the diaphragm to an unstretched state and unseat the diaphragm from port 230. Diaphragm 208 remains seated on outlet port 230 and prevents water flow through emitter 220 until a difference between local pressure (i.e. water pressure in pipe 199 at inlet port 204) and atmospheric pressure decreases to such an extent that the sealing force no longer overcomes the elastic forces of stretched diaphragm 208 that operate to restore the diaphragm to its unstretched state. Integrated bipolar emitter 220, in accordance with an embodiment of the invention, therefore has a stable arrest-pressure threshold. If, after emitter 220 begins discharging water from an irrigation pipe in which it is installed, local pressure at inlet port 204 becomes equal to or greater than the arrest-pressure threshold, the emitter ceases to discharge water. In FIG. 4B emitter 220 is shown for a situation in which local pressure is equal to or greater than the arrest-pressure threshold of the emitter and diaphragm 208 seats on and seals outlet port 230 against egress of water.

It is noted that whereas bipolar emitter 220 is an integrated emitter, bipolar emitters in accordance with embodiments of the invention are not limited to integrated emitters having a configuration similar to emitter 220 or to integrated emitters. A bipolar emitter having a sufficiently large output port to provide a stable arrest-pressure threshold may for example have a circularly cylindrical frame and a diaphragm seated on an annular support shelf rather than the elongate frame and support structure implied by FIG. 4B. A bipolar emitter may also by way of example be an emitter that is coupled externally to an irrigation pipe or inline between portions of an irrigation pipe.

In the above description it has been assumed that irrigation pipe 40 in FIGS. 2A-2C and irrigation pipe 140 in FIGS. 3A and 3B are substantially horizontal so that changes in pressure along irrigation pipes 40 and 140 due to changes in height of the irrigation pipe may be ignored in determining discharge and/or arrest pressures of emitters 22 and 122 in the pipe and inlet pipe pressures provided by the source of water that provides water to the pipe. An irrigation pipe for use in a terrain characterized by "non-ignorable" height changes in the irrigation pipe and having emitters in accordance with an embodiment of the invention that characterized by different discharge and/or arrest thresholds can readily be configured by a person of the art. For example, assume that an emitter comprised in an irrigation pipe in accordance with an embodiment of the invention at a given location in the terrain is located at a height $\Delta h$ relative to a height of the pipe inlet. Assume further that were the given location to be at a same height as the inlet, the emitter would be configured to have a discharge-pressure threshold $P_1$. To accommodate the height difference $\Delta h$, the emitter at the given location is configured to have a discharge-pressure threshold threshold equal to $(P_1 - \Delta h \rho g)$, where g is the acceleration of gravity and $\rho$ the specific gravity of water ($=1$ g/cm$^3$).

In general at various times and for various reasons, irrigation of plants is periodically stopped. During such times it is often desired or necessary to drain water out of an irrigation pipe to prevent water from stagnating in the pipe or to facilitate removal of the pipe firm a growing field and its transport to another field or storage. For example, at an end of a growing cycle it might be desirable to remove irrigation pipes from a field. Often removal involves rolling up the pipes, usually onto readily transported and stored drums. Prior to rolling up the pipe it must be drained of water. If the pipe is fitted only with non-return emitters, which provide for improved reliability of irrigation by reducing emitter clogging, it can be difficult and tedious to drain the pipe because the emitters do not allow air to enter the pipe and replace water that is drained from the pipe.

Figure 5A:
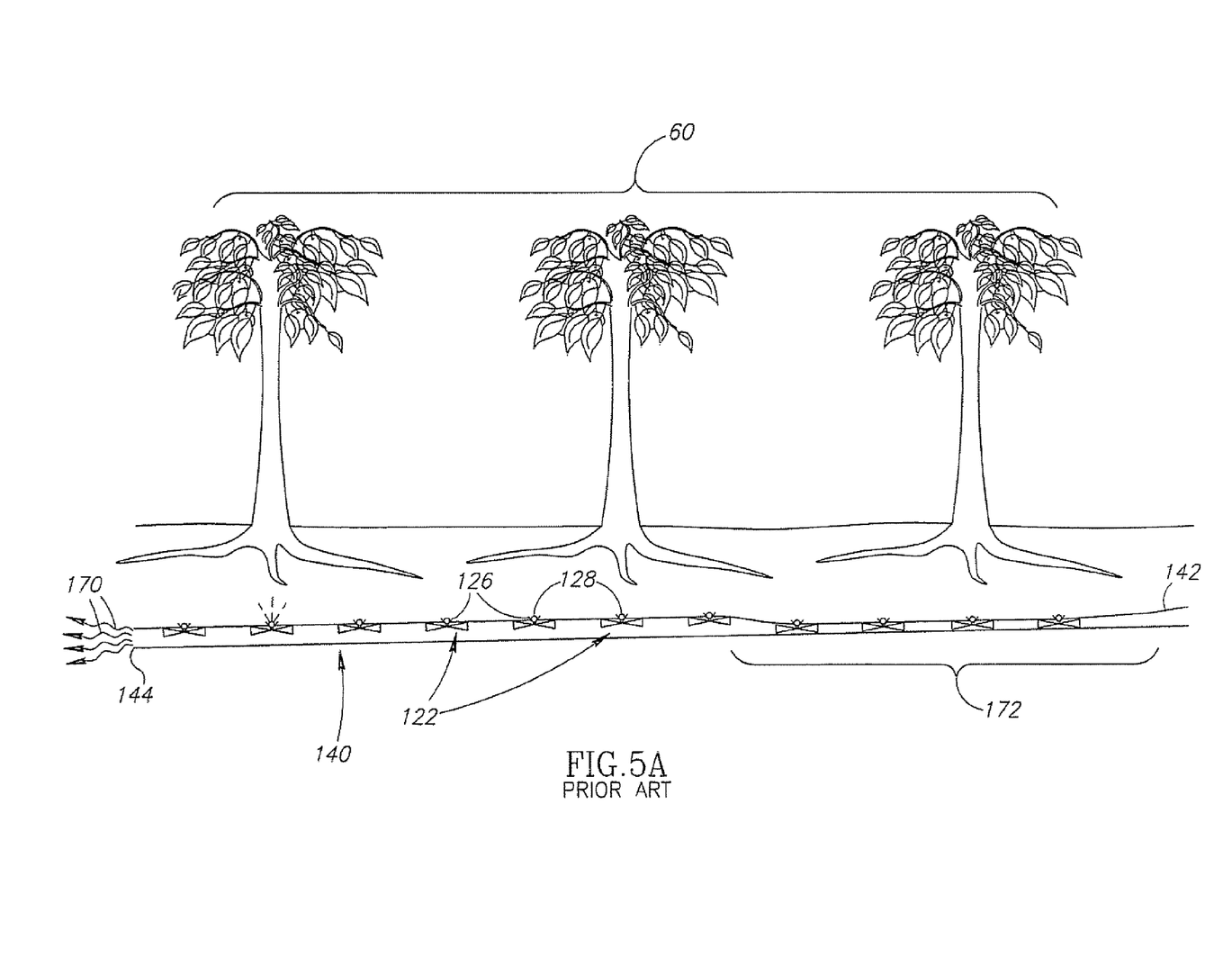
FIG. 5A schematically shows an irrigation pipe comprising only non-return emitters being drained of water in accordance with prior art.

FIG. 5SA schematically shows an irrigation pipe 140 comprising emitters 122 all of which are non-return emitters that prevent backflow of air and/or water when flow of water to the irrigation pipe is stopped. The non-return characteristic of emitters 122 is graphically indicated in FIG. 5A and in following FIGS. 5B and 5C by the emitters having a "scaling ball" 128 located in their respective output orifices 126. By way of example, FIG. 5A schematically shows irrigation pipe 140 located to irrigate orchard 60. The figure schematically shows what might happen to the pipe when water to the pipe is shut off and water is drained from an end 144 of the pipe, optionally by opening a valve (not shown) at the end of the pipe. The open valve at the end of pipe 140 is graphically represented by end 144 of the pipe being open, and water draining from the pipe is represented by wavy arrows 170. Irrigation pipe 140 is assumed to slope downward slightly from an end 142 at which a water supply (not shown) is connected to supply water to the pipe.

As water drains, a vacuum is generated in the pipe in regions of the pipe near end 142. The vacuum causes the pipe to collapse in on itself in response to forces generated by atmospheric pressure. A region 172 of pipe 140 that is collapsed by atmospheric pressure is indicated in FIGS. 5A. Atmospheric pressure applies substantial force to pipe 140 and its collapse under atmospheric pressure can damage the pipe walls and emitters 122 in the pipe.

Figure 5B:
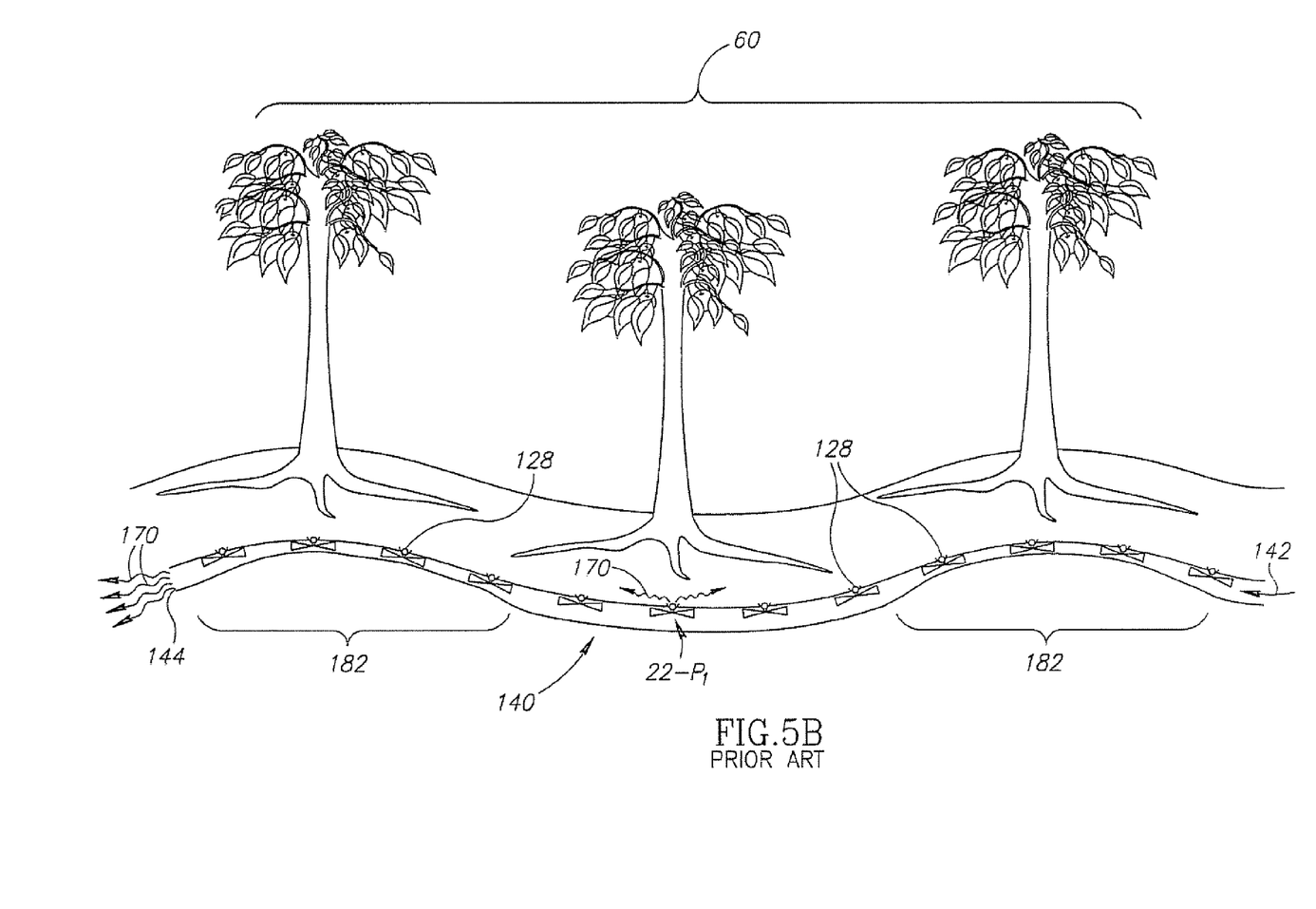
FIG. 5B schematically shows an irrigation pipe comprising non-return emitters located on a relatively hilly terrain, being drained of water, in accordance with prior art.

For an irrigation pipe laid out on a hilly terrain, depending upon how airtight the pipe is and differences in elevation of various sections of the pipe, sections of the pipe that are located at relatively high elevations tend to develop various degrees of vacuum that collapse and distort the pipe structure. FIG. 5B schematically shows irrigation pipe 140 shown in FIG. 5A located on a hilly terrain and draining through end 144 and by way of example also via an emitter 22-$P_1$ located at a relatively low region of the hilly terrain. Draining via low lying emitter 22-$P_1$ is graphically indicated by wavy arrows 170. Sections 182 of the pipe on relatively elevated sections of the terrain have collapsed as a result of vacuum formed in the sections.

To make draining an in irrigation pipe easier and to reduce the probability of it being damaged when drained, an irrigation pipe in accordance with an embodiment of the invention comprises at least one emitter, i.e. a free-flow emitter, that is not a non-return emitter and has a discharge-pressure threshold substantially equal to zero. The at least one flee-flow emitter allows air to enter the irrigation pipe through the emitter and replace water that leaves the pipe when the pipe is drained. As a result, water is able to drain out of the pipe relatively freely and the probability that the pipe will be damaged as a result of generation of a vacuum in the pipe is reduced. Optionally, to allow air to enter an irrigation pipe in accordance with an embodiment of the invention a one way valve that does not allow water to exit the pipe but enables air to enter freely is mounted to the pipe. Whereas in accordance with an embodiment of the invention, a free-flow emitter or a one way valve may be used to allow air to enter the pipe, a free-flow emitter can be advantageous because when water is provided to the pipe, water exits the pipe through the free-flow emitter at rates appropriate for irrigation applications.

To accommodate different growing terrains and terrains having changes in elevation that occur over relatively short distances, a plurality of free-flow emitters are coupled to the irrigation pipe. Optionally, the number of free flow emitters is between about 10% to about 50% of the total number of emitters coupled to the irrigation pipe. Optionally, the irrigation pipe comprises at least one free-flow emitter for every five non-return emitters. Optionally, the irrigation pipe comprises at least one flee-flow emitter for every three non-return emitters In some embodiments of the invention, free-flow emitters are positioned in the irrigation pipe in a predetermined configuration. In an embodiment of the invention, a same number of non-return emitters is located between any two nearest flee-flow emitters. Optionally the free-flow emitters are randomly distributed in the irrigation pipe.

Figure 5C:
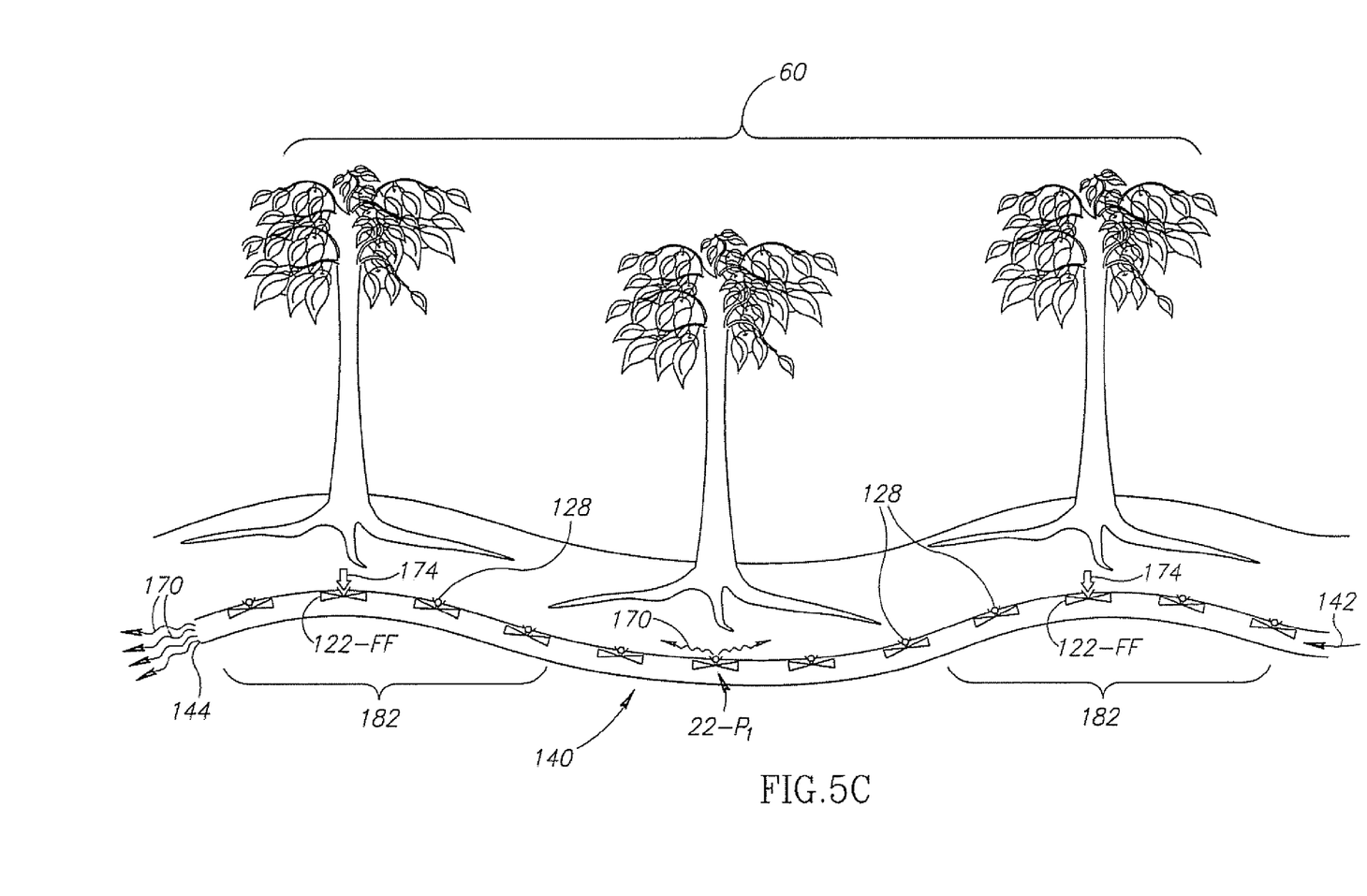
FIG. 5C schematically shows the irrigation pipe shown in FIG. 5B and comprising free-flow emitters being drained of water, in accordance with an embodiment of the invention.

FIG. 5C schematically shows irrigation pipe 140 shown in FIG. 5B but additionally comprising a plurality free-flow emitters 122-FF in accordance with an embodiment of the invention. Free-flow emitter 122-FF is graphically indicated in FIG. 5C by an emitter icon absent ball 128 (FIGS. 5A, 5B) used for non-return emitters to indicate that the non-return emitters are self-sealing. In FIG. 5C, pipe 140 is being drained of water but as a result of the presence of the at least one free-flow emitter 122-FF, air indicated by block arrows 174 is able to enter the pipe through the emitters and the pipe does not collapse.

In the description and claims of the present application, each of the verbs, "comprises" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of the described embodiments and embodiments of the invention comprising different combinations of features noted in the described embodiments will occur to persons of the art. The scope of the invention is limited only by the following claims.

The invention claimed is:

1. An irrigation pipe comprising:
at least one first integrated irrigation emitter characterized by a first non-zero discharge-pressure threshold, whereby the at least one first irrigation emitter is capable of discharging water in response to a first non-zero water inlet pressure; and
at least one second integrated irrigation emitter characterized by a second non-zero discharge-pressure threshold higher than the first discharge-pressure threshold, whereby the at least one second irrigation emitter is capable of discharging water only in response to a second non-zero water inlet pressure which is higher than the first non-zero water inlet pressure; wherein:
the at least one first and at least one second integrated irrigation emitters are positioned along the irrigation pipe in accordance with a predetermined configuration; and
the at least one first and at least one second irrigation emitters each comprise at least one labyrinth configured to provide resistance to water flow.

2. An irrigation pipe in accordance with claim 1:
wherein at least one of the integrated irrigation emitters is characterized by an arrest-pressure threshold which is greater than the discharge-pressure threshold of that integrated irrigation emitter; and
wherein the irrigation emitter characterized by an arrest-pressure threshold:
begins to discharge water, if the local water pressure in the pipe at the location of the irrigation emitter exceeds the discharge-pressure threshold of that irrigation emitter, and
ceases to discharge water if the local water pressure in the pipe at the location of the irrigation emitter exceeds the arrest-pressure threshold.

3. An irrigation pipe according to claim 1 and comprising:
at least one integrated free-flow irrigation emitter, which is not a non-return irrigation emitter.

4. An irrigation pipe comprising:
a plurality of integrated non-return irrigation emitters each having a non-zero discharge-pressure threshold; and
at least one integrated free-flow irrigation emitter, which is not a non-return irrigation emitter, wherein:
the non-return irrigation emitters and the at least one free-flow emitter each comprise at least one labyrinth configured to provide resistance to water flow;
at least one first integrated non-return irrigation emitter is capable of discharging water in response to a first non-zero water inlet pressure, and
at least one second integrated non-return irrigation emitter is capable of discharging water only in response to a second non-zero water inlet pressure which is higher than the first non-zero water inlet pressure.

5. An irrigation pipe according to claim 3, comprising at least one free-flow irrigation emitter for every ten non-return irrigation emitters.

6. An irrigation pipe according to claim 3, comprising at least one free-flow irrigation emitter for every five non-return irrigation emitters.

7. An irrigation pipe according to claim 3, comprising at least one free-flow irrigation emitter for every three non-return irrigation emitters.

8. An irrigation pipe according to claim 3, comprising substantially a same number of free-flow irrigation emitters and non-return irrigation emitters.

9. An irrigation pipe according to claim 3, wherein the free-flow irrigation emitters are positioned in the pipe in accordance with a predetermined configuration.

10. An irrigation pipe according to claim 3, wherein the free-flow irrigation emitters are randomly positioned in the pipe.

11. An irrigation system comprising:
an irrigation pipe comprising:
at least one first integrated irrigation emitter characterized by a first non-zero discharge-pressure threshold;
at least one second integrated irrigation emitter characterized by a second non-zero discharge-pressure threshold higher than the first discharge-pressure threshold; wherein:
the at least one first and at least one second integrated irrigation emitters are positioned along the irrigation pipe in accordance with a predetermined configuration; and
the at least one first and at least one second irrigation emitters each comprise at least one labyrinth configured to provide resistance to water flow; and
a source of water coupled to the irrigation pipe that is controllable to provide water at different inlet pressures to the irrigation pipe, wherein:
the at least one first irrigation emitter is capable of discharging water in response to a first non-zero water inlet pressure, and
the at least one second irrigation emitter is capable of discharging water only in response to a second non-zero water inlet pressure which is higher than the first non-zero water inlet pressure.

12. An irrigation system according to claim 11 further comprising:
a controller that controls the source of water to provide water at different desired inlet pressures to the irrigation pipe corresponding to different configurations of activated and non-activated irrigation emitters.

13. A method of producing an irrigation pipe comprising:
providing a pipe having an internal lumen; and
mounting a plurality of irrigation emitters to the pipe wall inside the lumen in accordance with a predetermined configuration, each of said plurality of irrigation emitters comprising at least one labyrinth configured to provide resistance to water flow; wherein:
at least two of the irrigation emitters have different non-zero discharge-pressure thresholds whose values differ from one another, whereby:

a first of the at least two irrigation emitters is capable of discharging water in response to a first non-zero water inlet pressure, and a second of the at least two irrigation emitters is capable of discharging water only in response to a second non-zero water inlet pressure which is higher than the first non-zero water inlet pressure.

14. A method of irrigating plants comprising:

providing at least one irrigation pipe in accordance with claim 1 to irrigate the plants; and controlling inlet pressure to the at least one irrigation pipe to provide different configurations of activated and non-activated irrigation emitters of the plurality of irrigation emitters.

15. A method of irrigating plants comprising:

providing at least one irrigation pipe in accordance with claim 4 to irrigate the plants; and controlling inlet pressure to the at least one irrigation pipe to provide different configurations of activated and non-activated irrigation emitters of the plurality of irrigation emitters.

16. An irrigation pipe in accordance with claim 1, further comprising:

at least one third integrated irrigation emitter characterized by a third non-zero discharge-pressure threshold different from the first discharge-pressure threshold and the second discharge-pressure threshold; wherein:

the at least one first, the at least one second and the at least one third integrated irrigation emitters are positioned along the irrigation pipe in accordance with a predetermined configuration.

17. An irrigation system in accordance with claim 11, wherein the irrigation pipe further comprises:

at least one third integrated irrigation emitter characterized by a third non-zero discharge-pressure threshold different from the first discharge-pressure threshold and the second discharge-pressure threshold; wherein:

the at least one first, the at least one second and the at least one third integrated irrigation emitters are positioned along the irrigation pipe in accordance with a predetermined configuration.

18. The method of producing an irrigation pipe according to claim 13, wherein:

at least three of the irrigation emitters have different non-zero discharge-pressure thresholds whose values differ from one another.

\* \* \* \* \*